United States Patent
Ledger et al.

(10) Patent No.: US 6,558,493 B1
(45) Date of Patent: May 6, 2003

(54) RELEASING OF BONDED SCREENS

(75) Inventors: Neville Richard Ledger, Morriston (GB); Christopher Davies, Dyfed (GB); Robert Marc Clement, Pontardawe (GB)

(73) Assignee: Carglass Luxembourg Sarl-Zug Branch, Zug (CH)

( * ) Notice: Subject to any disclaimer, the term of this patent is extended or adjusted under 35 U.S.C. 154(b) by 0 days.

(21) Appl. No.: 09/427,405

(22) Filed: Oct. 25, 1999

Related U.S. Application Data

(63) Continuation of application No. 09/133,854, filed on Aug. 14, 1998, now abandoned, which is a continuation of application No. 08/693,060, filed on Aug. 13, 1996, now abandoned, which is a continuation of application No. PCT/GB95/02847, filed on Dec. 6, 1995.

(30) Foreign Application Priority Data

Dec. 7, 1994 (GB) .............................. 9424659

(51) Int. Cl.⁷ .............................. B32B 35/00
(52) U.S. Cl. ................ 156/98; 156/344; 156/584; 29/402.08; 29/426.4
(58) Field of Search .............. 156/94, 98, 344, 156/584; 29/402.03, 402.08, 426.4

(56) References Cited

U.S. PATENT DOCUMENTS

| | | | |
|---|---|---|---|
| 3,242,314 A | 3/1966 | Eckles | |
| 3,392,259 A | 7/1968 | Meier | |
| 3,464,534 A | 9/1969 | Muncheryan | |
| 4,635,415 A | 1/1987 | Schumacher et al. | |
| 4,743,091 A | 5/1988 | Gelbart | |
| 4,804,975 A | 2/1989 | Yip | |
| 4,808,789 A | 2/1989 | Muncheryan | |
| 5,061,332 A | 10/1991 | Stolz et al. | |
| 5,269,868 A | * 12/1993 | Gofuku et al. | ............... 156/344 |
| 5,272,716 A | 12/1993 | Stolz et al. | |
| 5,423,931 A | * 6/1995 | Inoue et al. | ................... 156/94 |
| 5,468,238 A | 11/1995 | Mersch | |
| 5,580,471 A | 12/1996 | Fukumoto et al. | |
| 5,895,589 A | 4/1999 | Rogers et al. | |
| 6,237,216 B1 | * 5/2001 | Jin | ............................ 29/403.1 |

FOREIGN PATENT DOCUMENTS

| | | | |
|---|---|---|---|
| CA | 2073092 | * 4/1993 | ................. 156/344 |
| DE | 4320341 | 12/1994 | |
| EP | 0185139 | 6/1986 | |
| EP | 0215960 | 4/1987 | |
| EP | 0217019 | 4/1987 | |
| EP | 0 319 023 | 6/1989 | |
| EP | 0 377 376 | 7/1990 | |
| EP | 0 492 786 | 7/1992 | |
| EP | 0521825 | 1/1993 | |
| EP | 0603047 | 6/1994 | |
| EP | 0 762 409 A1 | 8/1996 | |
| FR | 2 508 267 | 11/1985 | |
| JP | 58-173619 | 10/1983 | |
| JP | 7-155978 | 6/1995 | |
| JP | 11-267627 | 10/1999 | |
| RU | 1789150 | 1/1993 | |
| RU | 2008042 | 2/1994 | |
| WO | WO-97/17737 | * 6/1996 | |

* cited by examiner

Primary Examiner—Mark A. Osele
(74) Attorney, Agent, or Firm—Merchant & Gould P.C.

(57) ABSTRACT

Bonded screens such as vehicle windscreens (1) bonded to a supporting frame (5) by homogeneous bonding material (6) are released by firstly arranging energy delivery means (9) adjacent the screen and subsequently transmitting energy from the delivery means through the screen thereby to effect release of the screen (1) from the frame (5) by either causing degradation of some of the homogeneous bonding material and/or cleavage or degradation of the screen material. The energy delivered may, for example, be ultrasonic or laser radiation, and is preferably arranged to be concentrated at a predetermined localized region to enhance the release mechanism.

30 Claims, 1 Drawing Sheet

RELEASING OF BONDED SCREENS

Figure 1:
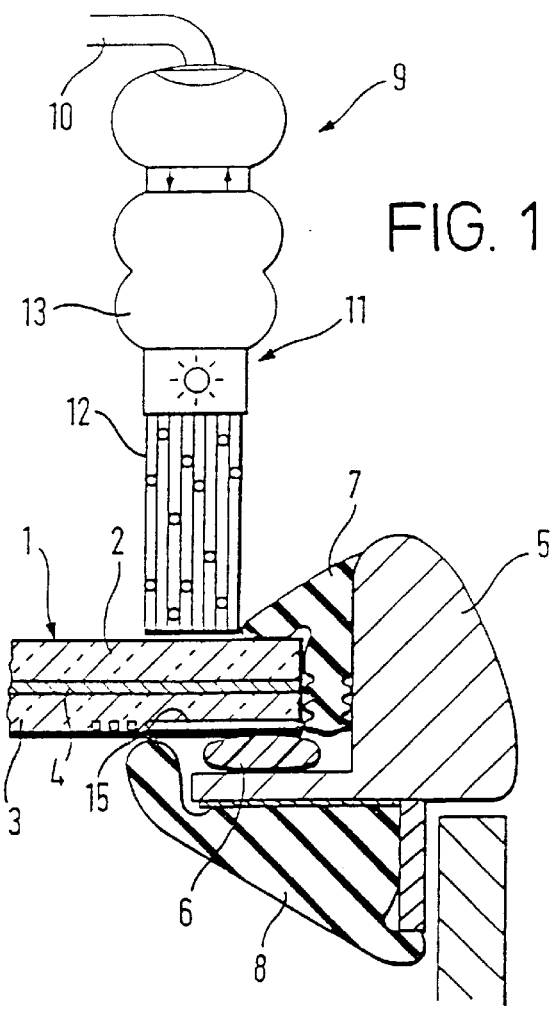

This application is a continuation of U.S. patent application Ser. No. 09/133,854 filed Aug. 19, 1998 now abandoned, which is a continuation of U.S. patent application Ser. No. 08/693,060 filed Aug. 13, 1996, now abandoned which is a continuation of PCT/GB95/02847, filed Dec. 6, 1995.

The present invention relates to means for releasing a screen from a support structure or frame to which the screen is bonded. In particular the invention relates to means for releasing a glass pane or screen (such as a vehicle windscreen) bonded by means of an interposed bonding material to a frame.

Bonded vehicle windscreens commonly need replacing as a result of motoring accidents, vandalism etc. At present, the bonded connection between the windscreen and the support frame is typically released using manual, mechanical means such as the use of sharp angled blades, "cheese wire" techniques etc. Use of these known techniques sometimes causes damage to the vehicle (in particular the bodywork and interior trim) which can be expensive to repair. Furthermore, operatives using these known physical techniques are prone to injury as a result of accidents occurring whilst performing the task.

An alternative proposal for an adhesive joint enabling release of a bonded screen from a supporting frame is disclosed in CA-A-2073092 in which a heatable separating member is provided closely fitting or embedded in an adhesive bead. The heatable sealing member disclosed is heated to a temperature at which it is either destroyed or loses adhesion to closely fitting elements or parts of the joint. The disclosure emphasises that the separating element loses its adhesion or is destroyed at a temperature at which the adhesive bead is not damaged.

A problem with the proposal of CA-A-2073092 is that a relatively complex joint is required incorporating discrete heatable element and separate bonding bead which remains substantially unaffected when the heating element is heated. A further drawback is that at present the commercial market for replacement windscreens is substantially restricted to existing vehicles most of which have screens bonded to frames using a single homogeneous bead of polymeric bonding material interposed between the screen and frame. The bonding material is homogeneous to the extent that it is of substantially uniform composition throughout. In this context the homogeneous bonding material may sometimes comprise fillers or other particular additives materials substantially evenly distributed throughout the bonding material.

An improved means of releasing bonded screens has now been devised, which comprises a method of releasing a screen from a frame to which the screen is bonded by interposed homogeneous bonding material, the method comprising the steps of (a) arranging energy delivery means adjacent the screen; and (b) transmitting energy from said energy delivery means through material comprising the screen thereby to:
  i) cause degradation of material comprising the homogeneous bonding material; and/or
  ii) cleavage or degradation of material comprising the screen, thereby to effect release of the screen from the frame.

For performance of the invention in its broadest sense, it is necessary that the screen is transparent to the extent that the energy may be transmitted through the screen to permit release of the screen from the support frame.

The invention is, however, particularly suited for use in releasing (for replacement) vehicle windscreens which are commonly bonded in and to surrounding support frames. In this respect, the screen will typically comprise a material transparent to visible light (such as glass). The homogeneous bonding material preferably comprises a flexible polymeric material (preferably a rubber or elastomeric material such as polyurethane), typically provided as an homogeneous bead extending about the periphery of the screen, interposed between the screen and frame. Such homogeneous bonding material is used in modern vehicle windscreen fitting techniques, almost exclusively.

It is preferred that the mechanism effecting release of the screen from the frame is pyrolytic degradation of the homogeneous bonding material, preferably of a portion of the body of the material most closely adjacent the screen. The degradation of the bonding material may alternatively be by photodissociation or photochemical degradation. Following degradation and release, a remainder portion of the homogeneous bonding material (substantially un-degraded) remains bonded to the frame. Where the bonding material comprises a synthetic organic polymeric material, the degradation when pyrolytic may comprise carbonisation of the material.

The energy delivery means is arranged adjacent a portion of the screen (typically a peripheral portion of the screen) which is bonded to the frame. The energy is then transmitted through the screen toward the location of the bonding material which is interposed between the respective portions of the screen and frame.

It is preferred that the energy delivery means is arranged to deliver wave energy to be transmitted through a localised region of the screen. The wave energy may be electromagnetic wave energy, such as light, or vibrational/sound energy.

In one embodiment, it is preferred that the energy delivery means comprises laser delivery means arranged to transmit laser radiation through the screen to release the screen from the frame. In this embodiment, it is preferred that the laser delivery means is arranged to transmit laser radiation having a wavelength in the visible/near infra-red region of the spectrum. Alternatively, the laser radiation delivered may be in the ultra-violet region of the spectrum.

The laser energy delivery means is preferably directed such that the radiation is transmitted to and absorbed by the bonding material, preferably in a specific portion (or notional layer) most closely adjacent the screen, as described above.

The laser radiation may be focused at a predetermined location. Desirably the laser radiation is continuous wave and enables relatively high intensity/energy radiation to be delivered to, and effect degradation (pyrolytically or otherwise) of, specific localised regions of the bonding material, consequently minimising damage to portions of the screen and un-degraded portions of the bonding material remaining.

Where the energy delivery means comprises ultrasonic delivery means, an ultrasonic transducer is preferably powered to generate ultrasonic energy of sufficient intensity to effect release of the screen. The ultrasonic energy is preferably arranged to be focused (or concentrated) at a predetermined location. The ultrasonic energy may effect release of the screen by pyrolytic degradation of the bonding material and/or cleavage of material comprising the screen. Alternatively, the ultrasonic energy may effect release by other means, such as for example by means of differential induced stresses at the bonding material/screen interface. It is believed that use of ultrasonic energy to effect release of a screen bonded to a frame may be novel and inventive per se.

Whether laser, ultrasonics, or other energy is used, it is preferred that the energy is arranged to be concentrated.

Desirably, the energy delivery means is arranged adjacent a first face of the screen, the screen being bonded to the support structure at a second, obverse, face.

It is preferred that tuning means is provided arranged to tune the frequency or intensity of the wave energy delivered by the energy delivery means.

Typically, the screen comprises glass and may comprise a glass/plastics laminated structure.

The invention is particularly suitable for the release for repair or replacement of vehicle windscreens; it is however suitable for use in other applications, such as for example release of architectural panels or glass screens (windows) bonded to architectural frames.

Figure 2:
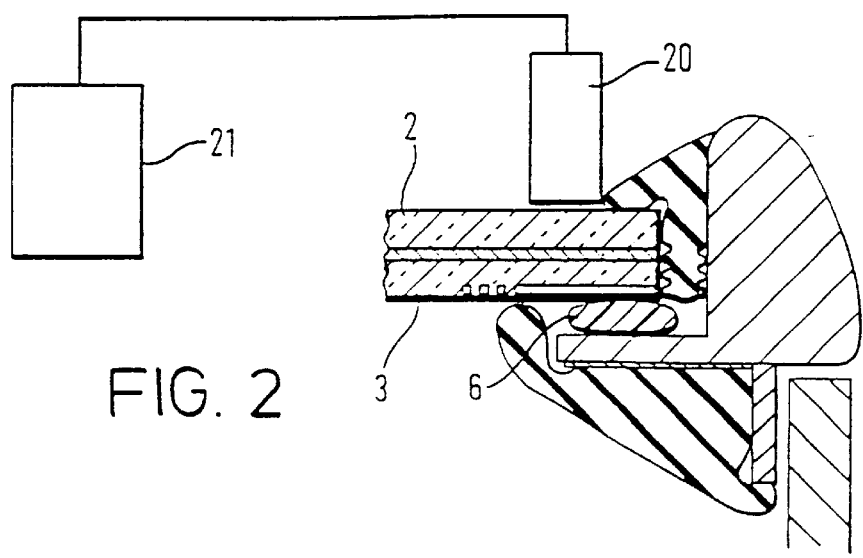

The invention will now be further described in specific embodiments by way of example only, and with reference to the accompanying drawings, in which FIG. 1 is a schematic representation of a first exemplary method according to the invention; and FIG. 2 is a schematic representation of an alternative method according to the invention.

Referring initially to FIGS. 1 and 2, there is shown a vehicle laminated windscreen 1 comprising a pair of glass sheets 2, 3 separated by an intermediate laminating plastics layer 4. Windscreen 1 is bonded to a vehicle windscreen frame 5 by means of an interposed homogeneous rubber bonding bead 6 which extends around the periphery of windscreen 1. Bonding bead 6 comprises a thermoplastic adhesive material applied as a viscous melt to the inner surface of windscreen 1 which is then fitted into frame 5, where bonding bead 6 hardens to securely bond the windscreen 1 to frame 5. The inner surface of windscreen 1 is provided with a peripheral ultra-violet (UV) barrier comprising a screen-printed layer 15 arranged to inhibit UV radiation passing through the windscreen and impinging on the bonding bead 6, which could otherwise adversely affect the integrity of the bond. An external rubber seal 7 and internal vehicle trim 8 are provided at the screen 1/frame 5 connection for weatherproofing and cosmetic reasons respectively.

In order to remove the windscreen from the frame 5, laser delivery system 9 may be used as described below. The laser delivery system comprises a waveguide 10 directing laser radiation from an energy source (not shown) to an applicator head 11 which is placed adjacent the peripheral edge of the windscreen 1 to direct laser radiation through the windscreen 1. Applicator head 11 includes a beam guide 12 and a slidable on/off switch 13.

Continuous wave in laser radiation is directed from applicator head 11 through a localised portion of the windscreen 1 to impinge upon the bonding bead 6. The laser radiation, being in the visible and near infra-red region of the electromagnetic spectrum, is absorbed by the bonding bead 6 in the portion thereof immediately adjacent the underside of screen. Only that portion of the bead 6 immediately adjacent the screen 1 increases rapidly in temperature. The rapid temperature increase causes thermal pyrolytic degradation of the portion of the bead 6 immediately beneath screen 6, whilst leaving an underlying remainder layer/portion bonded to the frame. The laser radiation can have a wavelength in the range from about 350 nm to 1000 nm.

Alternatively, the laser radiation may be concentrated or focused to heat that portion of the windscreen 1 immediately adjacent bonding bead 6 resulting in fragmentation/degradation or cleavage of the glass adjacent the screen printed layer 15 causing separation of the bonding bead 6 from the remainder of the windscreen.

Applicator head 11 is guided (either automatically or manually) around the entire periphery of the windscreen with the laser radiation activated to ensure complete separation around the entire periphery. The windscreen 1 may then be simply lifted from frame 5 and the surface of the remainder of homogeneous bead 6 pared, prepared and softened for a replacement windscreen to be fitted. Seal 7 may be removed prior to use of the laser delivery system.

A laser delivery system having the following parameters is suitable for performance of the invention.

| Wavelength | 820 nm |
| Donor | 60 watts |
| Beam section | 18 mm by 4 mm |

The above parameters are given as an example only, and other laser delivery systems could be used providing the energy delivered is sufficient to cause the required degradation and/or fragmentation of the glass.

As an alternative to a laser delivery system, in accordance with the invention other energy delivery means may be utilised. Referring to FIG. 3, there is shown apparatus for carrying out the invention utilising ultrasonic energy. An ultrasonic piezoceramics transducer 20 is placed in contact with the surface of sheet 2 of the windscreen 1, which has initially been prepared with a couplant gel (not shown) to maximise the proportion of energy transferred from the transducer 20 to the glass sheet 2 of windscreen 1. Ultrasonic acoustic energy is generated by transducer 20 which is connected to an electrical power supply 21. Ultrasound waves are transmitted through the windscreen 1 such that the rubber material of bonding bead 6 is removed either by cleavage of the material of glass sheet 3 immediately backing bead 6, pyrolytic degradation of the portion of bonding bead 6 contacting windscreen 1, or by separation due to ultrasonic vibration at the bead 6/windscreen 1 interface.

The separation or removal can be achieved by using ultrasound of sufficiently high intensity to induce high mechanical stresses within the glass, at the glass/rubber interface or in the bonding bead itself. Furthermore, the acoustic, ultrasonic energy may be focused to produce an enhanced effect, typically by use of a focusing element (not shown) and/or the provision of a suitable transition structure or layer on the contact surface of the transducer 20. Transducer 20 is guided around the entire periphery of the windscreen (either manually or more preferably automatically) to ensure complete release of the screen from the surrounding frame.

What is claimed is:

1. A method of releasing a vehicular window pane from a supporting frame to which the window pane is bonded by interposed homogeneous bonding material, the method comprising the steps of:

(a) arranging a light energy delivery apparatus having an applicator head placed in contact with the window pane adjacent a peripheral edge of the window pane; and (b) transmitting light energy having a wavelength in the range from about 350 nm to 1000 nm from the applicator head of the light energy delivery apparatus through material comprising the window pane and causing thermal pyrolytic degradation of material comprising at least one of the homogeneous bonding material and the window pane, thereby to effect release of the window pane from the frame.

2. A method according to claim 1, wherein a portion only of the bonding material is degraded, a remainder portion of said homogeneous bonding material remaining un-degraded and bonded to the window pane or in the frame.

3. A method according to claim 2, wherein the remainder portion of the bonding material remains bonded to the frame.

4. A method according to claim 1, wherein the bonding material is provided as a bead extending around the periphery of the window pane, the light energy delivery apparatus being arranged adjacent a peripheral portion of the window pane to effect localised release of a portion of the window pane, and tracked to follow the bead around the periphery of the window pane thereby to effect complete release of the window pane.

5. A method according to claim 1, wherein the light energy delivered is of a wavelength and intensity suitable for
 a) transmission through the window pane; and
 b) absorption by the homogeneous bonding material to a degree sufficient to cause degradation thereof, and/or cleavage or degradation of material comprising the window pane.

6. A method according to claim 1, wherein the light energy delivered is arranged to be concentrated at a predetermined location.

7. A method according to claim 1, wherein the light energy is pulsed.

8. A method according to claim 1, wherein the light energy delivery apparatus is directed such that the light energy is transmitted to and absorbed at an absorbing layer comprising the window pane, the absorbing layer being contiguous with the bonding material bonding the window pane to the frame.

9. A method according to claim 1, wherein the light energy is focused at a predetermined location.

10. A method according to claim 1, wherein the light energy delivered is tunable such that the frequency or intensity of the light energy delivered may be varied.

11. A method of replacing a window pane in a frame, the method comprising releasing a window pane from the frame in accordance with the method of claim 1 and subsequently replacing a different window pane, in the frame and securing the window pane in the frame.

12. A method of releasing a vehicular laminated window pane comprising a pair of sheets separated by an intermediate laminating layer and bonded to a vehicle window pane frame by bonding material, the method comprising the steps of:
 (a) arranging a light energy delivery system having au applicator head placed in contact with one of the sheets adjacent the peripheral edge; and
 (b) transmitting light energy having a wavelength in the range from about 350 nm to 1000 nm from the applicator head of the light energy delivery system through the pair of glass sheets and laminated layer; and
 (c) introducing rapid temperature increase and causing thermal pyrolytic degradation of at least either one of the bonding material and the sheet adjacent the bonding material without heating the intermediate laminating layer to cause delamination of the sheets of the window pane, thereby to effect release of the window pane from the frame.

13. A method of releasing a vehicular window pane from a supporting frame to which the window pane is bonded by interposed homogeneous bonding material, the method comprising the steps of:
 (a) arranging a light energy delivery apparatus having an applicator head placed in contact with the window pane adjacent the peripheral edge thereof and;
 (b) transmitting light energy having a wavelength in the range from about 350 nm to 1000 nm from the applicator head of the light energy delivery apparatus through material comprising the window pane and causing thermal pyrolytic degradation of material comprising at least one of the homogeneous bonding material and the window pane, to effect release of the window pane from the frame;
 (c) removing the widow pane from the frame and leaving a portion of the bonding material bonded to the frame;
 (d) preparing bonding material on the frame; and
 (e) replacing a window pane in contact with the prepared bonding material.

14. A method of releasing a vehicular window pane from a supporting frame to which the window pane is bonded by interposed homogeneous bonding material, the method comprising the steps of:
 (a) arranging a light energy delivery apparatus adjacent a peripheral edge of the window pane; and
 (b) transmitting light energy having a wavelength in the range from about 350 nm to 1000 nm from the light energy delivery apparatus through material comprising the window pane and causing thermal degradation of material comprising at least one of the homogeneous bonding material and the window pane, thereby to effect release of the window pane from the frame.

15. A method of releasing a vehicular window pane from a supporting fame to which the window pane is peripherally bonded by interposed bonding material, the method comprising the steps of:
 (a) arranging a light energy delivery apparatus adjacent a peripheral edge of the window pane;
 (b) transmitting light energy having a wavelength in the range from about 350 nm to 1000 nm from the light energy delivery apparatus through material comprising the window pane thereby to effect localized thermal release of the window pane from the frame in the region of transmission of the light energy; and
 (c) tacking the light delivery apparatus about the periphery of the window pane thereby to effect complete release of the window pane from the fame.

16. A method of releasing a vehicular window pane from a supporting frame to which the window pane is bonded by interposed homogeneous bonding material, the method comprising the steps of:
 (a) arranging a light energy delivery apparatus having an applicator head placed in contact with the window pane adjacent a peripheral edge of the window pane; and
 (b) transmitting light energy from the applicator head of the light energy delivery apparatus through material comprising the window pane and causing thermal pyrolytic degradation of material comprising at least one of the homogeneous bonding material and the window pane, thereby to effect release of the window pane from the frame.

17. A method according to claim 16, wherein a portion only of the bonding material is degraded, a remainder portion of said homogeneous bonding material remaining un-degraded and bonded to the window pane or in the frame.

18. A method according to claim 17, wherein the remainder portion of the bonding material remains bonded to the frame.

19. A method according to claim 16 wherein the bonding material is provided as a bead extending around the periphery of the window pane, the light energy delivery apparatus being arranged adjacent a peripheral portion of the window pane to effect localized release of a portion of the window pane, and tracked to follow the bead around the periphery of the window pane thereby to effect complete release of the window pane.

20. A method according to claim 16, wherein the light energy delivered is of a wavelength and intensity suitable for
    a) transmission through the window pane; and
    b) absorption by the homogeneous bonding material to a degree sufficient to cause degradation thereof, and/or cleavage or degradation of material comprising the window pane.

21. A method according to claim 16, wherein the light energy delivered is arranged to be concentrated at a predetermined location.

22. A method according to claim 16, wherein the light energy is pulsed.

23. A method according to claim 16, wherein the light energy delivery apparatus is directed such that the light energy is transmitted to and absorbed at an absorbing layer comprising the window pane, the absorbing layer being contiguous with the bonding material bonding the window pane to the frame.

24. A method according to claim 16, wherein the light energy is focused at a predetermined location.

25. A method according to claim 16, wherein the light energy delivered is tunable such that the frequency or intensity of the light energy delivered may be varied.

26. A method of replacing a window pane in a frame, the method comprising releasing a window pane from the frame in accordance with the method of claim 16 and subsequently replacing a different window pane in the frame and securing the window pane in the frame.

27. A method of releasing a vehicular laminated window pane comprising a pair of sheets separated by an intermediate laminating layer and bonded to a vehicle window pane frame by bonding material, the method comprising the steps of:
    (a) arranging a light energy delivery system having an applicator head placed in contact with one of the sheets adjacent the peripheral edge; and
    (b) transmitting light energy from the applicator head of the light energy delivery system through the pair of glass sheets and laminated layer; and
    (c) introducing rapid temperature increase and causing thermal pyrolytic degradation of at least either one of the bonding material and the sheet adjacent the bonding material without heating the intermediate laminating layer to cause delamination of the sheets of the window pane, thereby to effect release of the window pane from the frame.

28. A method of releasing a vehicular window pane from a supporting frame to which the window pane is bonded by interposed homogeneous bonding material, the method comprising the steps of:
    (a) arranging a light energy delivery apparatus having an applicator head placed in contact with the window pane adjacent the peripheral edge thereof and;
    (b) transmitting light energy from the applicator head of the light energy delivery apparatus through material comprising the window pane and causing thermal pyrolytic degradation of material comprising at least one of the homogeneous bonding material and the window pane, to effect release of the window pane from the frame;
    (c) removing the widow pane from the frame and leaving a portion of the bonding material bonded to the frame;
    (d) preparing bonding material on the frame; and
    (e) replacing a window pane in contact with the prepared bonding material.

29. A method of releasing a vehicular window pane from a supporting frame to which the window pane is bonded by interposed homogeneous bonding material, the method comprising the steps of:
    (a) arranging a light energy delivery apparatus adjacent a peripheral edge of the window pane; and
    (b) transmitting light energy from the light energy delivery apparatus through material comprising the window pane and causing thermal degradation of material comprising at least one of the homogeneous bonding material and the window pane, thereby to effect release of the window pane from the frame.

30. A method of releasing a vehicular window pane from a supporting frame to which the window pane is peripherally bonded by interposed bonding material, the method comprising the steps of:
    (a) arranging a light energy delivery apparatus adjacent a peripheral edge of the window pane;
    (b) transmitting light energy from the light energy delivery apparatus through material comprising the window pane thereby to effect localized thermal release of the window pane from the frame in the region of transmission of the light energy; and
    (c) tracking the light delivery apparatus about the periphery of the window pane thereby to effect complete release of the window pane from the frame.

* * * * *